May 31, 1927.

H. A. ERICKSON 1,630,476

PISTON, WRIST PIN, AND CONNECTING ROD ALIGNING JIG

Filed May 6. 1924  3 Sheets-Sheet 1

INVENTOR.
HERMAN A. ERICKSON by Frank Waterfield

ATTORNEY.

May 31, 1927.
H. A. ERICKSON
PISTON, WRIST PIN, AND CONNECTING ROD ALIGNING JIG
Filed May 6, 1924   3 Sheets-Sheet 2
1,630,476
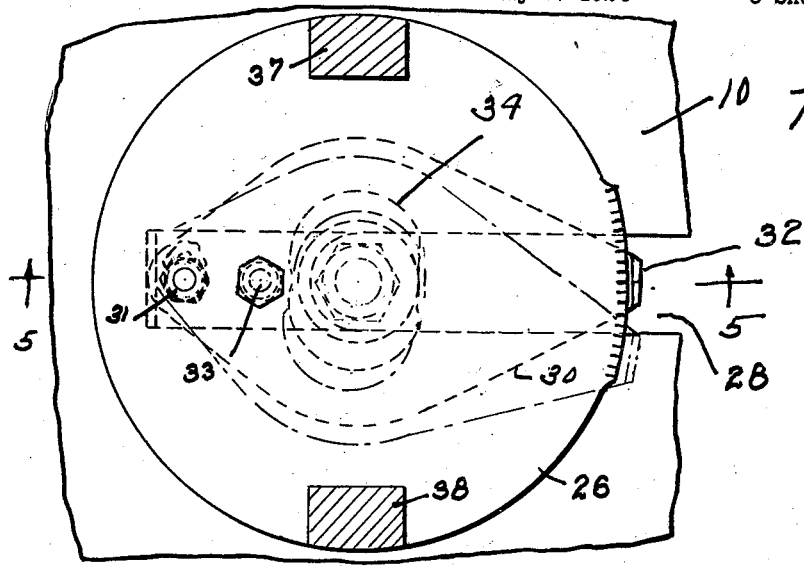
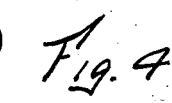
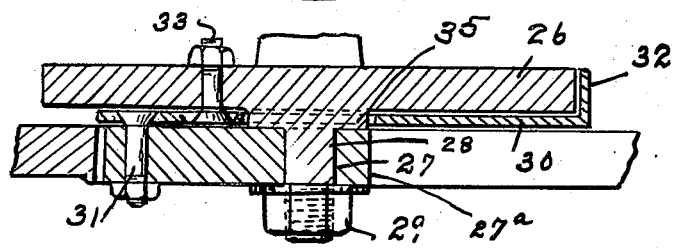
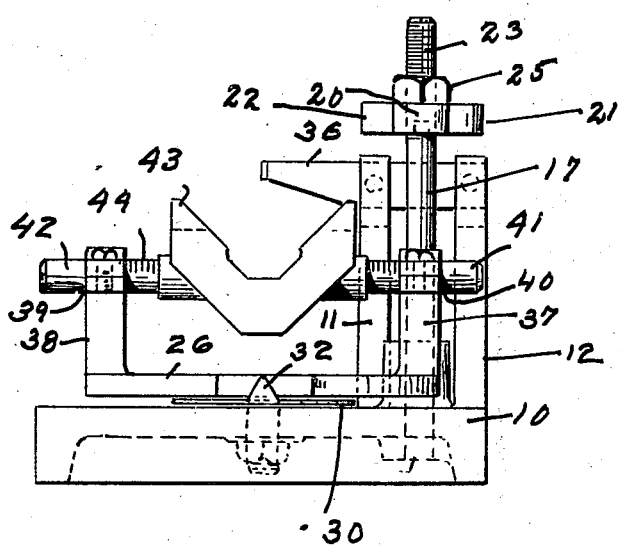
INVENTOR
HERMAN A. ERICKSON
by Frank Waterfield
ATTORNEY May 31, 1927.  
H. A. ERICKSON  
1,630,476  
PISTON, WRIST PIN, AND CONNECTING ROD ALIGNING JIG  
Filed May 6, 1924  3 Sheets-Sheet 3

INVENTOR.  
HERMAN A. ERICKSON  
by Frank Waterfield  
ATTORNEY

Patented May 31, 1927.

1,630,476

UNITED STATES PATENT OFFICE.

HERMAN A. ERICKSON, OF FRESNO, CALIFORNIA.

PISTON, WRIST PIN, AND CONNECTING-ROD ALIGNING JIG.

Application filed May 6, 1924. Serial No. 711,398.

My invention relates to a piston and wrist pin aligning jig provided with suitable indicating means by means of which the direction and amount of which the piston or wrist pin is out of alignment is indicated, this means being so constructed and arranged that the amount of misalignment is magnified upon the index so that the operator can readily see the side upon which the misalignment lies as well as the approximate amount thereof.

Heretofore in the use of aligning jigs for the above purpose it has been customary to use flat plates or V blocks against which the pistons were laid, and the amount the piston was out of alignment determined by the amount of daylight seen when gazing between the piston and the face plate.

It is the object of my invention to provide a device which is easily and quickly adjustable to any size or type of piston and which will easily and quickly indicate to the user the direction of misalignment and the amount thereof.

A further object is to provide in a device of the above character means for easily and quickly positioning the piston and its connecting rod therein.

A still further object is to provide a cheap, simple and efficient device as above outlined.

Other objects and advantages will appear hereinafter and, while I have shown and will describe the preferred form of my invention, I wish it understood that I do not limit myself to such preferred form, but that various changes and adaptations may be made therein without departing from the spirit of my invention.

In the drawings accompanying and forming a part hereof:

Fig. 3 is a right hand end elevation of Fig. 1.

Fig. 4 is an enlarged fragmentary detail on the line 4—4 of Fig. 1.

Fig. 5 is a section on the line 5—5 of Fig. 4.

Figure 1:
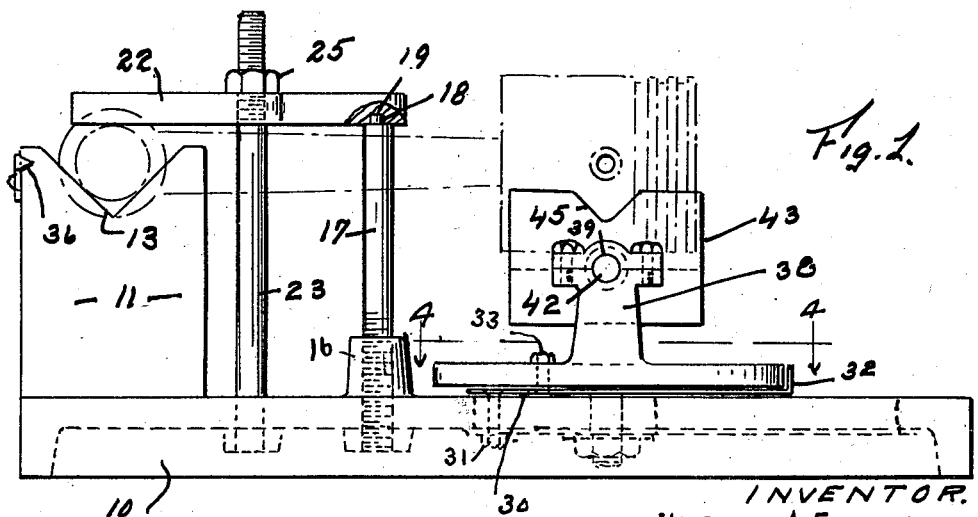
Fig. 1 is a side elevation of my device positioned for use.
Figure 7:
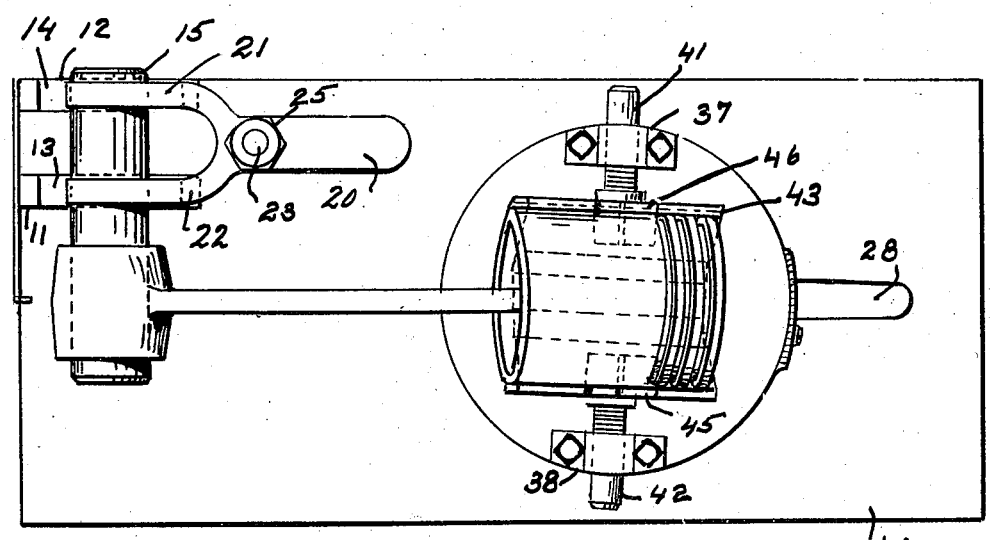
Fig. 7 is a top plan of Fig. 6.

Referring to the drawings, my device comprises a base 10, substantially rectangular in top plan, at one side of one end of which are provided a pair of spaced, vertically extending standards 11 and 12 in the upper ends of which are cut bearings V's 13 and 14 adapted to receive the mandrel 15 upon which the crank shaft end of the connecting rod is mounted. Extending upwardly from base 10 is a hub 16 in which is mounted the lower end of a stud 17 in screw-threaded engagement. The upper end 18 of stud 17 is reduced in size, as best shown in Fig. 1, and is loosely mounted within a socket 19 in one end of a binding clamp 20. Binding clamp 20 is substantially Y-shaped in top plan and has the free ends of its spaced legs 21 and 22 adapted to register with the upper ends of members 11 and 12 when positioned for use. A stud 23 is rigidly mounted at its lower end in base 10 adjacent to members 11 and 12 and its upper end passes loosely through an aperture 24 in member 20 and is provided on its upper end with a nut 25 in screwthreaded engagement, to provide means whereby legs 21 and 22 may be forced downwardly to bear against the upper surface of mandrel 15 to hold the same securely positioned for use. Rotatably mounted in base 10, intermediate its length, and on the longitudinal center thereof, is a table 26 by means of a pintle 27 passing loosely through a rectangular block 27ª slidably mounted in a longitudinally extending slot 28 in base 10 and is held positioned by a nut 29, and washer 29ª as best shown in Fig. 5. Mounted between table 26 and the upper face of base 10 is the indicating member 30 the rear end of which is pivotally connected to base 10 by means of pivot screw 31. The other end of member 30 extends forwardly to a short distance beyond the outer edge of table 26 and then is bent upwardly at a right angle and terminates in an index point 32. Member 30 is pivotally connected at a point midway between screw 31 and pintle 27 to table 26 by means of a pivot screw 33, the opening in member 30 in which said pivot screw is mounted being slotted for a purpose which will be obvious. Member 30 is provided with an elongated aperture 34, elongated transversely, to prevent interference with the movement thereof by the downwardly depending hub 35 of table 26. Secured to the upper ends of members 11 and 12, on the rear walls thereof, is an inwardly extending index finger 36 the free end of which is inturned and is used as a guide by means of which the crank shaft bearing end of a connecting rod may be centered with the center of table 26. Extending upwardly from table 26, at opposite sides thereof, are standards 37 and 38 the upper ends of which terminate in bearings 39 and 40, and revolubly mounted in these bearings are spindles 41 and 42 extending outwardly from each side of the V block 43. Portions of the upper surfaces of spindles 41 and 42 are provided with graduations or index marks 44 for the purpose of indicating the longitudinal alignment of the piston and connecting rod. V block 43 is so constructed that the center of gravity is at all times normally below the longitudinal center of spindles 41 and 42, thereby retaining the same in its operative position. Formed in the sides of V block 43 are V's 45 and 46 for the reception of the wrist pins when it is desired to align the same relative to the mandrel.

Figure 2:
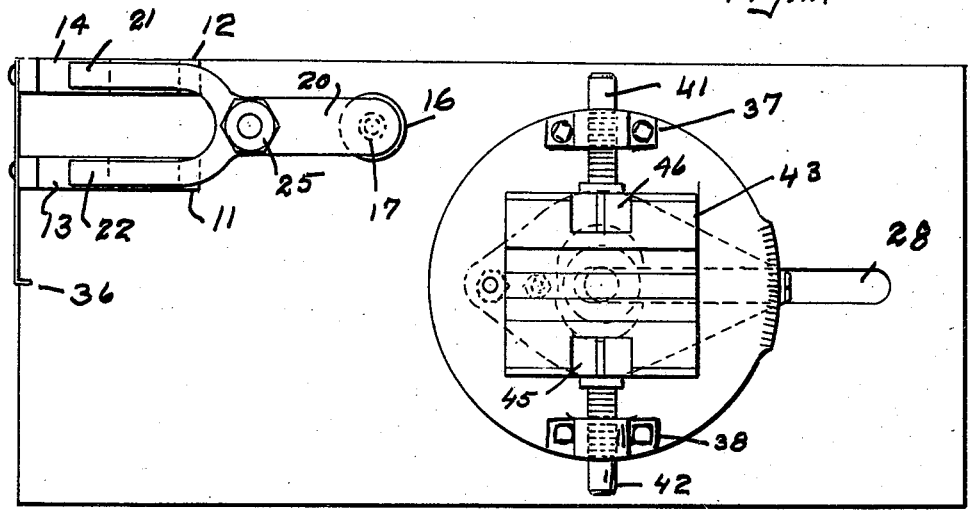
Fig. 2 is a top plan of Fig. 1.
Figure 6:
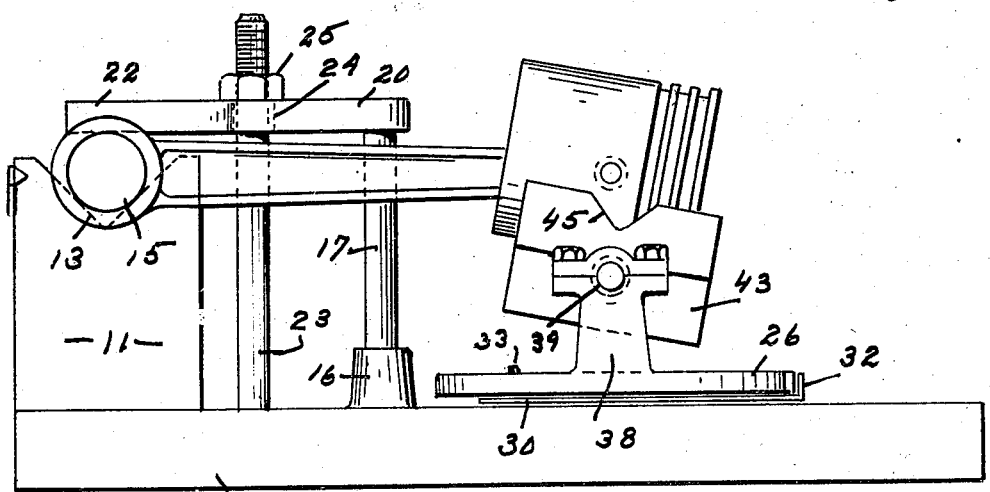
Fig. 6 is a view similar to Fig. 1, showing my device in operation.

In the operation of my device the parts will normally lie in the positions shown in Figs. 1, 2 and 3. When it is desired to align a piston, nut 25 will be loosened to permit the end of member 20 being removed from engagement with the reduced end 18 of stud 17 and rotated sidewise one-fourth turn to permit the insertion of the proper mandrel in the V's 13 and 14. Member 20 is then repositioned and nut 25 tightened to hold the mandrel securely positioned. The crank shaft end of the connecting rod is then positioned on the mandrel and the piston brought to rest upon the V block 43. By rocking the piston on its wrist pin, as best shown in Fig 6, V block 43 will also be rocked, and, in the event the piston is out of alignment, table 26 will be given a partial rotation. The rotation of table 26 will, by means of pintle 33, move the front end of the indicating member 30 and the index point 32 in the opposite direction to which the table is turning, but, due to the longer radius between point 32 and pivot screw 33 over the radius of table 26 the movement of the said index will be greatly magnified. In the event that the piston and connecting rod are not in alignment centrally, block 43 will be moved sidewise, thus indicating by the graduations 44 the amount they are out of alignment and also the direction.

Having described my invention, what I claim is:

1. A device of the character described comprising a base, a mandrel support carried by said base; a V-block; and means for mounting said block on said base so that it is rockable on a horizontal axis and rotatable around a vertical axis.

2. A device of the character described comprising a base; a mandrel support carried by said base; a table carried by said base rotatable around a vertical axis; a V-block carried by said table rotatable around a horizontal axis; and means between said table and base for indicating the relative movement therebetween.

3. In a piston and connecting rod aligning device a stationary base; a mandrel supporting member at one end of one side of said base; a table, means for connecting said table to said base so that it is adjustable longitudinally thereof and rotatable around a vertical axis; a V-block carried by said table and rotatable on a horizontal axis; and indicating means between said base and table adapted when said table is rotated to indicate the relative movement therebetween.

4. A piston and connecting rod aligning jig comprising a base; a pair of spaced standards extending upwardly from said base at one end of one side thereof; a table rotatably mounted upon said base intermediate the ends and on the longitudinal center thereof and adjustable longitudinally thereof; means to secure said table in its adjusted position; an indicating member between said table and base adapted to indicate the relative rotary movement of said table relative to said base; a V-block; and means for supporting said V-block on said table so as to make it rockable on a horizontal axis and movable in the direction of said axis, the pivots of said V-block having indicia to indicate movement in the direction of said axis.

5. A connecting rod aligning jig comprising a base, a mandrel, means for attaching said mandrel to the base, a table rotatably mounted on the base, an index member on the base and adapted to be moved when the table is rotated, a block pivotally mounted on the table, said block being adapted to support a piston held by a connecting rod mounted on said mandrel, said pivotal mounting being adapted to permit a rocking movement of the block, said pivotal mounting likewise being adapted to permit a sliding movement of the block parallel with the axis of said pivotal mounting.

6. A piston aligning jig comprising a base; a mandrel holding member upon said base; a table rotatably mounted upon said base and adjustable longitudinally thereof; a V block pivotally mounted upon said table capable of sidewise movement; an indicating member; connections between said table, indicating member and base, whereby when a connecting rod carrying a piston is mounted upon said mandrel and said piston is placed within said block and rocked upon its pin any inaccuracy or misalignment therein will cause said table to rotate and said indicating means to register said inaccuracy.

In witness that I claim the foregoing I have hereunto set my hand this 24th day of April, 1924.

HERMAN A. ERICKSON.